United States Patent [19]
Lemont

[11] Patent Number: 4,506,849
[45] Date of Patent: Mar. 26, 1985

[54] HELICOPTER ROTOR THRUST RING

[75] Inventor: Harold E. Lemont, Arlington, Tex.

[73] Assignee: Textron, Inc., Providence, R.I.

[21] Appl. No.: 388,413

[22] Filed: Jun. 14, 1982

Related U.S. Application Data

[63] Continuation of Ser. No. 134,871, Mar. 28, 1980, abandoned.

[51] Int. Cl.³ .............................................. B64C 27/82
[52] U.S. Cl. ..................... 244/17.21; 244/6; 244/17.11; 416/179; 415/209
[58] Field of Search ............... 244/6, 7 R, 12.1, 73 B, 244/12.2, 12.3, 23 C, 17.11, 17.25, 17.19, 17.21, 51, 52, 207, 208, 209; 415/208, 126, 209, 219 R; D12/325, 326, 330; 416/148, 179, 189, 245 C; 60/269

[56] References Cited

U.S. PATENT DOCUMENTS

| | | | |
|---|---|---|---|
| D. 197,447 | 2/1964 | Friedrich | D12/330 |
| 2,123,657 | 7/1938 | Munk | 415/208 |
| 2,510,561 | 6/1950 | DeLaval | 60/269 |
| 2,876,964 | 3/1959 | Streib | 244/12.2 |
| 2,922,277 | 1/1960 | Bertin | 244/207 |
| 3,054,578 | 9/1962 | Brocard | 244/73 B |
| 3,129,905 | 4/1964 | Taylor | 244/12.2 |
| 3,506,219 | 4/1970 | Moville et al. | 244/17.21 |
| 3,856,238 | 12/1974 | Malvestuto, Jr. | 244/6 |
| 4,196,877 | 4/1980 | Mutrux | 244/17.19 |

FOREIGN PATENT DOCUMENTS

| | | | |
|---|---|---|---|
| 2718178 | 11/1978 | Fed. Rep. of Germany | 244/12.2 |
| 2846217 | 5/1979 | Fed. Rep. of Germany | 244/12.2 |
| 1444868 | 5/1966 | France | 244/12.2 |
| 458941 | 8/1968 | Switzerland | 244/12.2 |

Primary Examiner—Galen L. Barefoot
Attorney, Agent, or Firm—Richards, Harris, Medlock & Andrews

[57] ABSTRACT

A helicopter tail rotor (14) is provided with a thrust ring. The thrust ring comprises an annular airfoil (16) having a circular opening which is aligned coaxially with the rotor (14). The plane of the airfoil (16) is essentially parallel to the plane of the rotor (14) but slightly offset downstream from the rotor (14). The cross section of the airfoil (16) can have a wide variety of configurations including flat and cambered. The tip vortices (30) produced by the rotor (14) are captured near the downstream surface of the airfoil (16) to produce a circulating airflow (32) that draws air from the upstream region of the airfoil (16) through the opening therein. The aerodynamic action of the airfoil (16) widens the wake diameter of the wash from rotor (14), increases rotor (14) thrust efficiency, reduces the noise level of rotor (14), enhances transverse stability and lowers the vibration level experienced by helicopter (10). The airfoil (16) further serves as a guard to protect the rotor (14).

34 Claims, 16 Drawing Figures

EFFICIENCY COMPARISON
FIG. 4

HELICOPTER ROTOR THRUST RING

This is a continuation of application Ser. No. 134,871 filed Mar. 28, 1980 now abandoned.

TECHNICAL FIELD

The present invention pertains generally to helicopters and in particular to an airfoil for augmenting the thrust of a helicopter rotor.

BACKGROUND ART

A countertorque tail rotor is an integral aspect in the design of the majority of helicopters now in use. But there are numerous problems related to the design and operation of such tail rotors. Tail rotors are frequently mounted adjacent vertical fins which are provided for aircraft stability and with this configuration the helicopter rotor produces a transverse airflow which impinges the fin thereby reducing the thrust of the rotor and consuming additional power. The combination of the fin with the tail rotor further creates a disruptive air flow pattern which reduces the directional stability of the aircraft.

The size of a tail rotor is relatively limited and, to provide the required aerodynamic response, the tail rotor must be driven at a high angular velocity. When operating, the tail rotor generates high noise levels.

The vortices produced by a main rotor and a tail rotor interact in such a manner as to reduce the efficiency of the thrust created by the rotors while increasing the noise level as a result of the vortex interference.

Therefore, there exists a need for aircraft structure for use in conjunction with a helicopter rotor, either main rotor or tail rotor, for enhancing the rotor thrust, reducing the noise level and increasing directional stability while at the same time enclosing the rotor to prevent damage to the aircraft and injury to ground personnel.

DISCLOSURE OF THE INVENTION

The present invention comprises structure for enhancing the performance of a helicopter rotor, the structure comprising an annular airfoil having a central opening with an inner diameter slightly greater than the diameter of the helicopter rotor and structure supporting the airfoil such that said opening is coaxial with the rotor and in a plane essentially parallel to the plane of the rotor wherein the airfoil captures vortices produced in the wash of the rotor.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
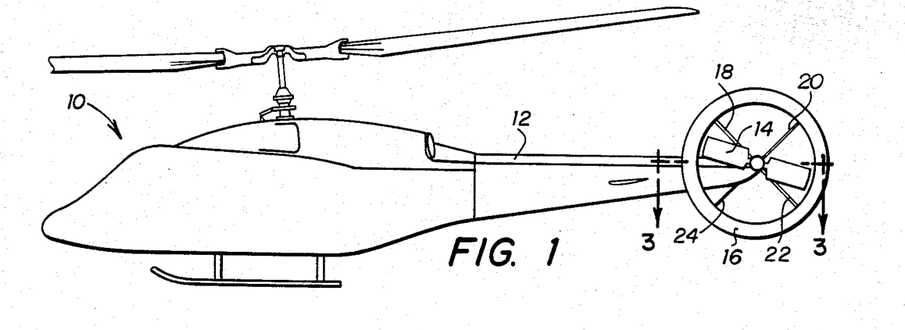
FIG. 1 is an elevation view of a helicopter equipped with a tail rotor thrust ring in accordance with the present invention.

Referring to FIG. 1, a helicopter 10 has a tail boom 12 which supports a tail rotor 14 at the aft end thereof. The tail rotor 14 provides countertorque force for transversely stabilizing the helicopter 10. A thrust ring 16 in the shape of a thin substantially planar annular airfoil is mounted parallel to and slightly downstream from the rotor 14. The thrust ring 16 is supported on tail boom 12 by fixed braces 18, 20, 22 and 24.

The thrust ring 16 provides a number of advantages over a conventional tail rotor structure which includes a vertical fin located adjacent the tail rotor 14. A conventional fin partially blocks the wake produced by a tail rotor while the thrust ring 16 permits the wake to pass through the central opening without obstruction. The ring 16 has sufficient lateral area to provide the transverse stability provided by a standard vertical fin. The vortices produced at the tips of the blades of rotor 14 are captured in the region adjacent the downstream surface of the ring 16. The captured vortices form a circulating air pattern which acts as a pump to draw additional air through the center of ring 16 from the region adjacent the upstream surface of the ring. The circulating air pattern and eduction increase the diameter of the wake and the volume of air transported by the rotor blade 14. The wake of rotor 14 is transported at a slower rate but comprises a greater mass of air by the operation of ring 16 thus resulting in increased efficiency in the operation of rotor blade 14.

The thrust ring 16 further reduces the noise level of rotor 14. The increased wake produced by rotor 14 as a result of ring 16 serves to increase the total lift provided by the main rotor of the helicopter 10. At the same time the control of the tail rotor vortices reduces the vibration of helicopter 10 which is normally caused by the interaction of the main rotor down wash with the vortices produced by the tail rotor.

The directional stability afforded the pilot of the helicopter 10 is enhanced by the operation of thrust ring 16 so that the pilot has a greater "feel" for the sidewise control of the aircraft.

The ring 16 further serves as a guard about the rotor 14 to reduce the instance of injury to ground personnel and to prevent the loss of aircraft due to the contact of an exposed rotor with obstacles such as trees and power lines.

Figure 2:
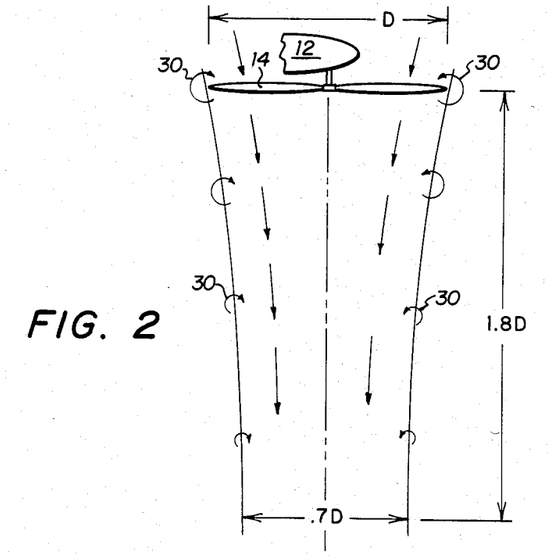
FIG. 2 is an illustration of the air flow through a conventional tail rotor.

The air flow through the tail rotor shown in FIG. 1 is illustrated in FIG. 2 as it occurs in the absence of a thrust ring. In FIG. 2 the diameter of the tail rotor 14 is shown by the letter "D". Note that the wake produced by the rotor 14 decreases in diameter in the downstream flow away from the rotor. At a distance of 1.8 diameters from the rotor 14 the wake has a width of approximately 0.7 of the diameter of the rotor 14. The rotor 14 produces vortices 30 at the outboard tips of the rotor. These vortices tend to circulate from the downstream side of the rotor outward and return into the flowpath as a circulating pattern. The circulation of vortices continues in the downstream portion of the wake. The power expended in producing these vortices is wasted.

Figure 3:
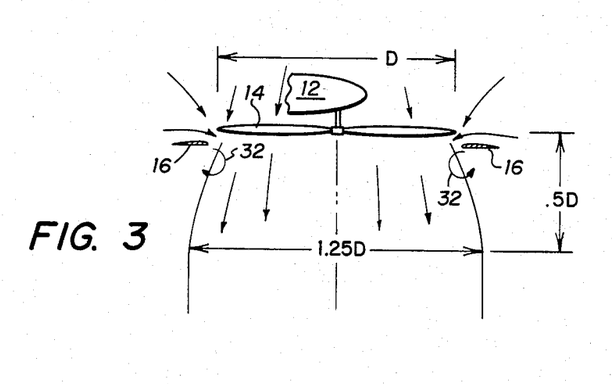
FIG. 3 is an illustration of the air flow through a tail rotor equipped with a thrust ring in accordance with the present invention.

The airflow through the tail rotor 14 when used in conjunction with a thrust ring 16 is illustrated in FIG. 3. Note that the thrust ring 16 is offset slightly downstream in the wash from the plane of the rotor blade 14. The thrust ring 16 is provided with a airfoil type cross section with the leading edge facing the center of the ring. The thrust ring 16 can, however, be a flat plate structure having a thin, rectangular cross section.

The wake produced by the rotor 14 when used in conjunction with the thrust ring 16 is dramatically different from that shown in FIG. 2. The vortices produced by rotor 14 are trapped in the region adjacent the downstream side of the thrust ring 16 where the vortices provide a continuous air circulation. This air circulation is shown by the reference numerals 32. The air circulation 32 of the rotor vortices causes additional air to be drawn from the region near the upstream side of the ring 16 through the central opening into the wake produced by the rotor. The circulating air functions as a lubricant or roller bearing interface between the moving and still air. The vortices in air circulation 32 further tend to spread the wake to have a substantially greater diameter than that shown in FIG. 2. For example, at a distance of 0.5 diameters from the rotor blade 14 the wake has a width of 1.25 diameters, substantially greater than the diameter of a wake which is produced in the absence of a thrust ring.

The wake produced by the combination of the rotor blade 14 and thrust ring 16 has approximately three times the area of the wake produced by the rotor blade 14 alone. The wake has a greater volume of air moving at a lesser speed. As a result of the thrust ring 16 a greater amount of energy is transferred to the air by the tail rotor 14 for a given amount of drive power. Thus, a portion of the power normally wasted in producing vortices is instead effectively used. Further, the capturing of the vortices produced by one blade of a rotor reduces the turbulance encountered by the following blade.

Referring to FIGS. 1 and 3, note that the thrust ring is offset slightly from the rotor and the opening in the thrust ring is larger than the diameter of the rotor. A further function of the thrust ring of the present invention is to guard the rotor. The ring serves to protect ground personnel and to prevent the tail rotor from being damaged in flight due to striking objects such as trees and power lines. A relatively minor contacct with an unguarded rotor can seriously damage the rotor causing the helicopter to be uncontrollable which can result in loss of the aircraft. The thrust ring provides substantial protection for the rotor and can even be distorted by impact without interfering with the tail rotor since the ring is offset a short distance from the plane of the rotor.

A thrust ring 16 as shown in FIGS. 1 and 3 was fabricated and flight tested on a Bell model 206B helicopter. A number of the results of flight and static testing of the thrust ring are shown in FIGS. 4–7.

Figure 4:
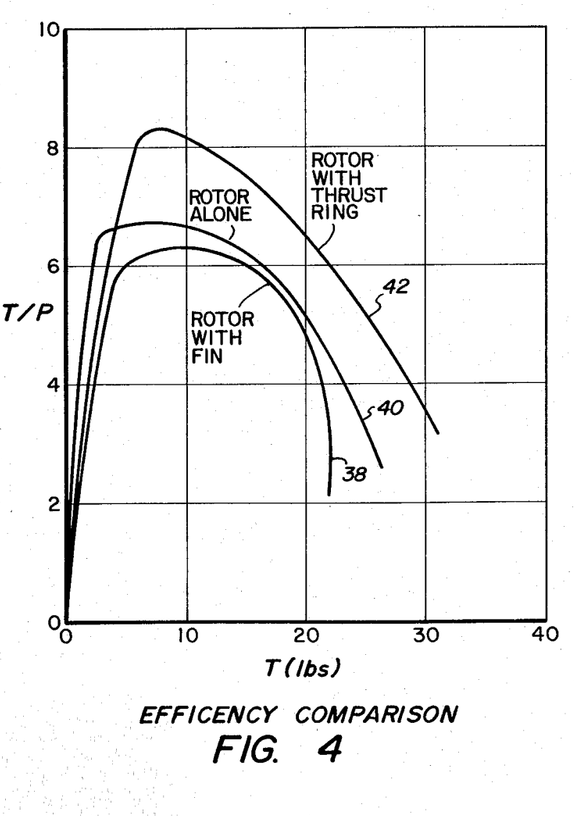
FIG. 4 is a graph comparing the thrust produced by a rotor equipped with a thrust ring, a rotor alone, and a conventional rotor with a vertical fin.

In FIG. 4 there is shown an efficiency comparison between a conventional tail rotor, a tail rotor alone and a tail rotor utilizing the thrust ring of the present invention. The horizontal axis of the graph in FIG. 4 shows thrust in pounds while the vertical axis is the ratio of thrust to power. The performance of a conventional tail rotor with a vertical fin is shown in curve 38 while the performance of a rotor with neither a fin or a thrust ring is shown in curve 40. The performance of a tail rotor equipped with a thrust ring, such as ring 16 shown in FIG. 1, is illustrated by curve 42. Note for all thrust values over 5 pounds that the rotor with the thrust ring has a substantially greater efficiency than either of the other two configurations. The relative percentage of improvement becomes even greater at higher thrust levels. The significance of the greater efficiency of the tail rotor used in conjunction with a thrust ring of the present invention is that less power is required to drive the tail rotor which results in decreased fuel consumption by the aircraft. Further, the tail rotor can be reduced in size by approximately 20% while having equivalent performance to existing tail rotor designs.

Figure 5:
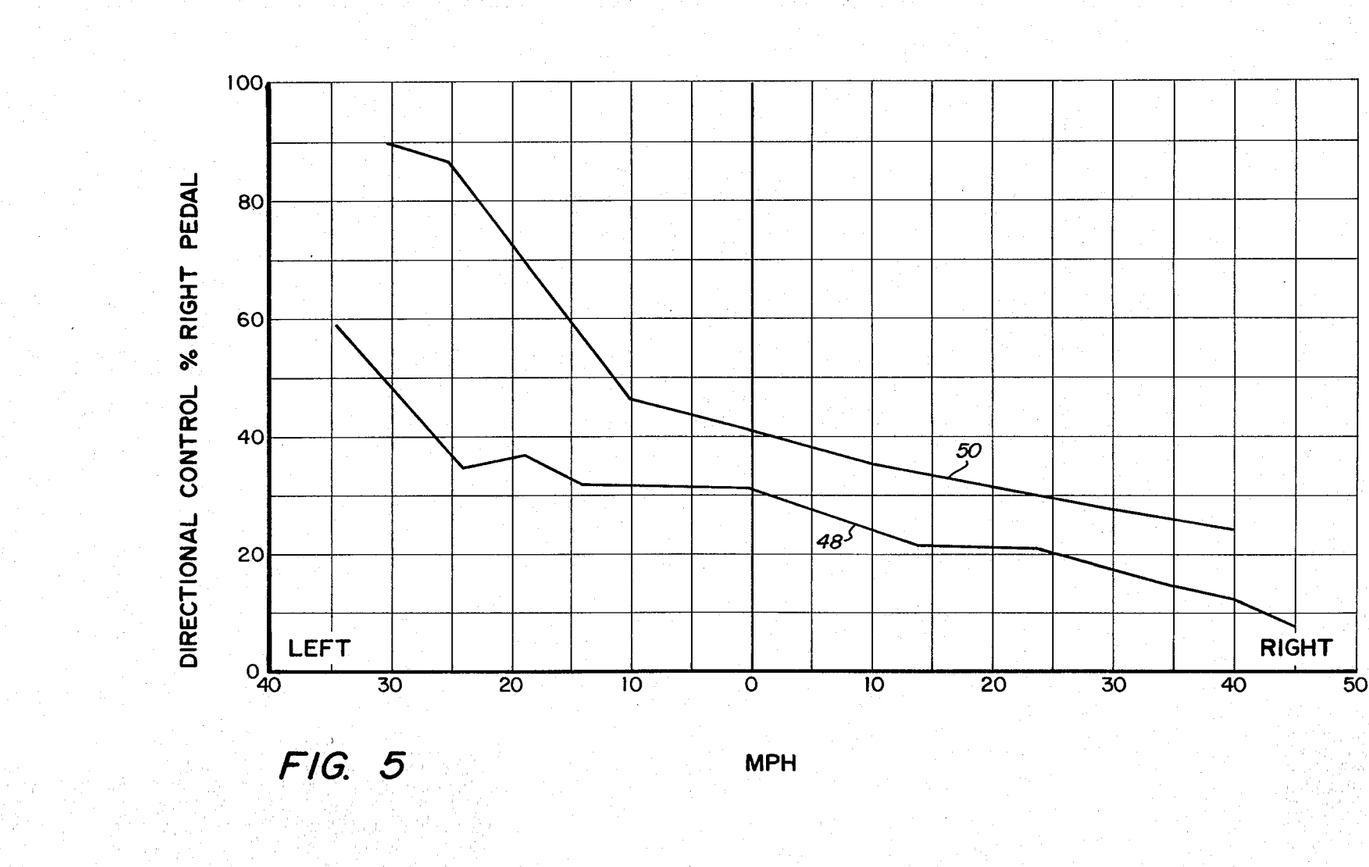
FIG. 5 is a graph illustrating the directional control provided by a tail rotor equipped with a thrust ring as compared to a conventional tail rotor.

The advantages of the thrust ring of the present invention in regard to sidewise flight is illustrated in FIG. 5. The horizontal axis of FIG. 5 is laid out to represent the transverse velocity of the helicopter. The vertical scale shows the percent of pedal deflection required to produce the corresponding sidewise velocity. The performance of the helicopter with a conventional tail rotor structure is illustrated by curve 48.

A pilot has the best control of a helicopter when there is a gradient to the curves shown in FIG. 5 such that a small change in the position of a control pedal results in a corresponding change in velocity. Note for curve 48 that in the region from 0 to 15 miles per hour in a left hand direction and in the region of 15 to 25 miles per hour in the right hand direction the curve is essentially flat. In these particular regions the pedal control is not responsive to the commands of the pilot. But with the thrust ring 16 of the present invention the performance of the helicopter in sidewise flight is noticeably altered.

In FIG. 5 there is shown a curve 50 in which the thrust ring was mounted at a 5 degree angle relative to the longitudinal axis of the aircraft. Note that this curve has no flat portions where aircraft control would be nonresponsive to the pilot. Further note that the gradient of the curve is substantially steeper than that for curve 48 thus offering the pilot a greater "feel" in controlling the aircraft.

Figure 6:
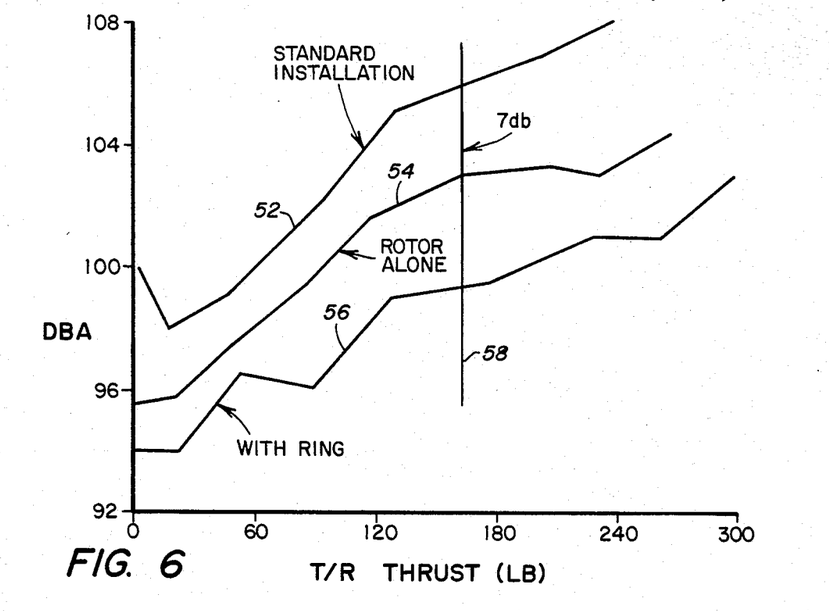
FIG. 6 is a graph comparing the noise produced by a tail rotor with a thrust ring, the rotor alone, and a standard tail rotor installation with the microphone positioned at a 45° angle away from the tail rotor hub.
Figure 7:
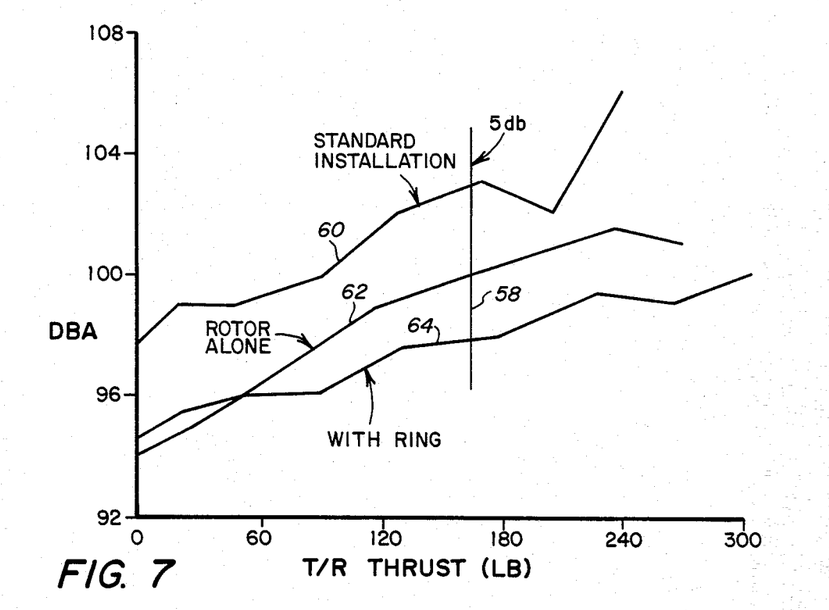
FIG. 7 is a graph comparing the noise produced by a tail rotor equipped with a thrust ring, the rotor alone and a conventional tail rotor assembly where the microphone is placed in the plane of the tail rotor.

The noise levels produced by various tail rotor configurations are illustrated in FIGS. 6 and 7. The horizontal axis in these FIGURES represents the thrust of the tail rotor while the vertical axis represents the amplitude of the noise as measured in DBA. (DBA is a standard of noise measurement often utilized by the Environmental Protection Agency and is a recognized standard in the noise measurement field.) In FIG. 6 the microphone which measured the amplitude of the noise was placed as an angle of 45° relative to the plane of the rotor disc and at a distance of 1.5 rotor diameters from the hub of the rotor. The noise level produced by a standard tail rotor configuration at various thrust levels is shown by curve 52. The noise level produced by a rotor alone is shown by curve 54. The noise produced by a tail rotor used in conjunction with a thrust ring as described above is illustrated by curve 56. A typical operating thrust value for the tail rotor is shown by line 58. At this level of thrust the tail rotor with the thrust ring has a noise amplitude approximately 7 db below that of a conventional tail rotor configuration. Since DBA is a logarithmic measurement the reduction of 7 db means that the thrust ring has reduced the sound energy to approximately ¼ that produced by a standard tail rotor configuration.

FIG. 7 is similar to that of FIG. 6 with the exception that the microphone used for measuring the amplitude of the noise was placed in the plane of the rotor at a distance of 1.5 rotor diameters from the hub. Curve 60 represents a standard tail rotor configuration, curve 62 represents a tail rotor alone while curve 64 represents a tail rotor utilizing a thrust ring as described above in FIG. 1. Note that at this angle the noise reduction provided by the thrust ring is approximately 5 db.

A significant portion of the noise produced by a helicopter is generated by the tail rotor due to its high angular velocity. Increased limitations are being placed on the operation of aircraft due to the allowable noise levels set by local and federal regulatory agencies. Since noise has become such a critical factor in the operation of aircraft, a noticeable reduction in the noise generated by an aircraft represents a substantial advance in the art.

It was observed in the test program for the thrust ring that the helicopter experienced a smooth transition from autorotation to powered flight. With a conventional tail rotor and fin this transition is generally turbulent.

Figure 8:
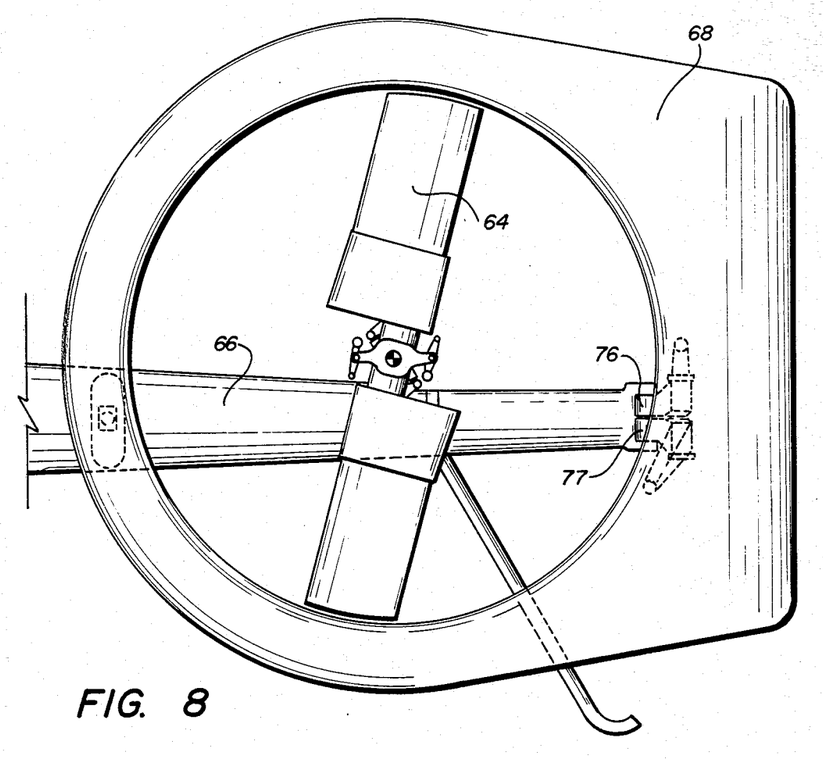
FIG. 8 is an elevation view of a combination tail rotor thrust ring and fin.
Figure 9:
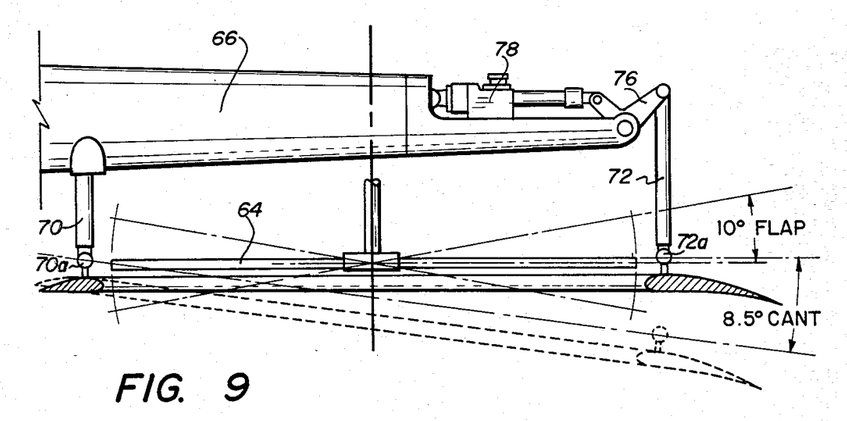
FIG. 9 is a plan view of the combination tail rotor thrust ring and fin shown in FIG. 8.
Figure 10:
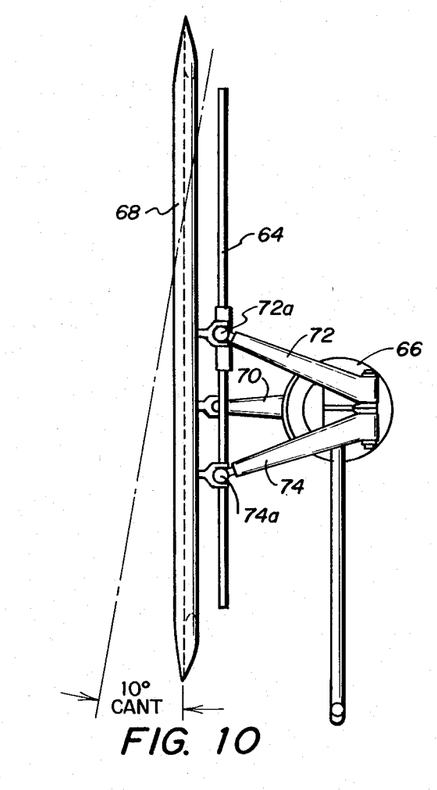
FIG. 10 is a rear elevation view of the combination tail rotor thrust ring and fin shown in FIG. 8.

A further embodiment of the thrust ring of the present invention is illustrated in FIGS. 8, 9 and 10. Referring to FIGS. 8-10, a tail rotor 64 is supported on a tail boom 66. Tail rotor 64 is preferably a bearingless type having collective pitch control. A combination thrust ring and fin 68 is mounted at its leading edge to the tail boom 66 by an arm 70. The ring/fin 68 is supported near its trailing edge by arms 72 and 74 spaced vertically.

The arm 70 is connected to the ring/fin 68 by a ball joint 70a while the arms 72 and 74 support the ring/fin 68 through ball joints 72a and 74a.

The arm 70 is fixed to the tail boom 66 but the arms 72 and 74 are connected to torque scissors 76 and 77. The torque scissor 76 is connected to a linear electric actuator 78. The arm 74 is connected through the scissor 77 to a corresponding linear electric actuator (not shown) mounted immediately below actuator 78.

Each of the electric actuators, such as 78, can separately position the ring/fin 68. When the two electric actuators are driven in concert the ring/fin 68 is pivoted at cant angles relative to the longitudinal axis of the aircraft. But when the two actuators are driven differentially the ring/fin 68 is tilted away from the vertical axis of the aircraft.

In a preferred embodiment the ring/fin 68 can be moved 8.5° outboard from the median position and 10° inboard. In response to a differential operation of the actuators the ring/fin 68 can be tilted 10° from the median position in either direction from the vertical. The ring/fin 68 can be simultaneously tilted relative to the longitudinal and vertical axes.

The ring/fin 68 is positioned by the pilot through either a trim setting or in conjunction with the helicopter collective control. Note also in FIG. 9 that the trailing edge of the ring/fin 68 has a greater chord length than the leading edge. The ring/fin 68 provides not only the enhanced thrust described above and the other desirable features of the thrust ring of the present invention but also fully replaces the conventional vertical fin heretofore used in helicopters of this type.

The ring/fin 68 is preferably fabricated of a composite graphite/epoxy material with a foam core.

Figure 11:
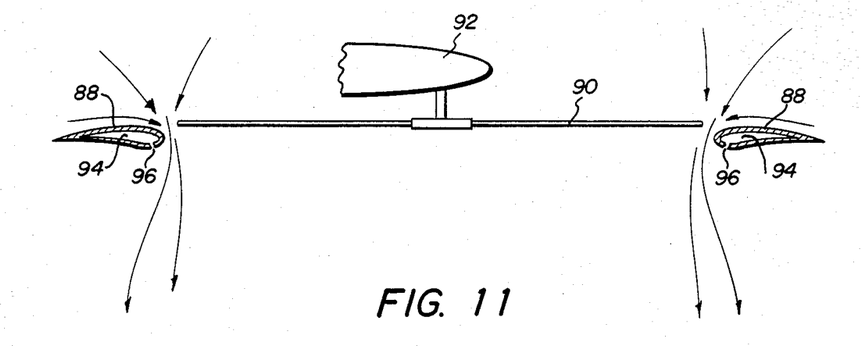
FIG. 11 is a plan view of a tail rotor and thrust ring where the thrust ring is equipped with vents for blowing air or sucking air relative to the vortex produced by the tail rotor.

A modified embodiment of the present invention is shown in FIG. 11. In this embodiment a thrust ring 88 is mounted about a tail rotor 90 which is supported by a tail boom 92. The thrust ring 88 functions in essentially the same manner as the thrust ring 32 shown in FIG. 3. The thrust ring 88 is, however, provided with an internal duct 94 which is open through a slot 96. In a first operational mode pressurized air is pumped into the duct 94 and permitted to exit through the slot 96. This energizes the boundary layer associated with the ring 88 and causes increased air flow through the center opening of the ring. This in turn increases the thrust associated with the ring due to the movement of a greater mass of air.

Referring further to FIG. 11, in a second operational mode air is drawn from duct 94 to apply suction through slot 96 to various sections of the downstream side of thrust ring 88. This prevents boundary layer buildup and also enhances the flow of air produced by tail rotor 90.

Figure 12:
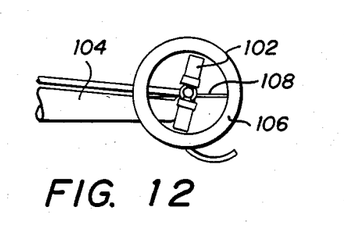
FIG. 12 is an elevation view of a combination tail rotor thrust ring and horizontal stabilizer.
Figure 13:
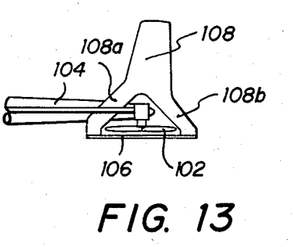
FIG. 13 is a plan view of the combination tail rotor thrust ring and horizontal stabilizer shown in FIG. 12.

A still further embodiment of the present invention is illustrated in FIGS. 12 and 13. A tail rotor 102 is supported from a tail boom 104. A thrust ring 106 is supported by boom 104 in the manner described in reference to FIGS. 1 and 3. A Y-shaped horizontal stabilizer 108 is connected through members 108a and 108b to the thrust ring 106. The horizontal stabilizer 108 is further supported by the tail boom 104.

The combination of thrust ring 106 and horizontal stabilizer 108 shown in FIGS. 12 and 13 provide all of the advantages described above for the thrust ring used in conjunction with a helicopter tail rotor. The thrust ring 106 also functions as a vertical fin (stabilizer). Thus the combination airfoil comprising ring 106 and stabilizer 108 provides both horizontal and vertical stabilization for a helicopter.

Figure 14:
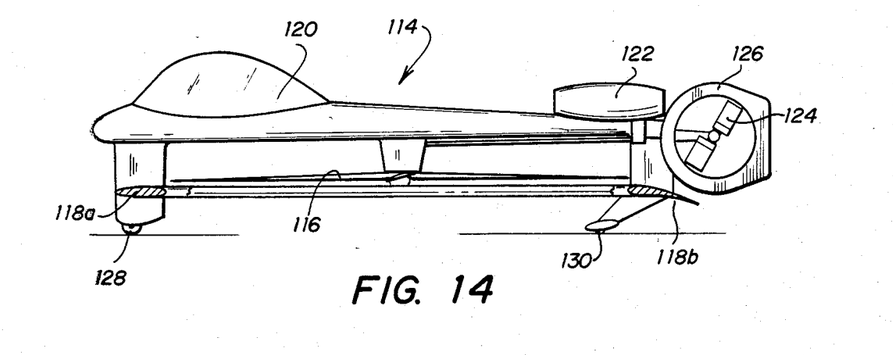
FIG. 14 is an elevation view of a helicopter having a thrust ring surrounding a low mounted main rotor.
Figure 15:
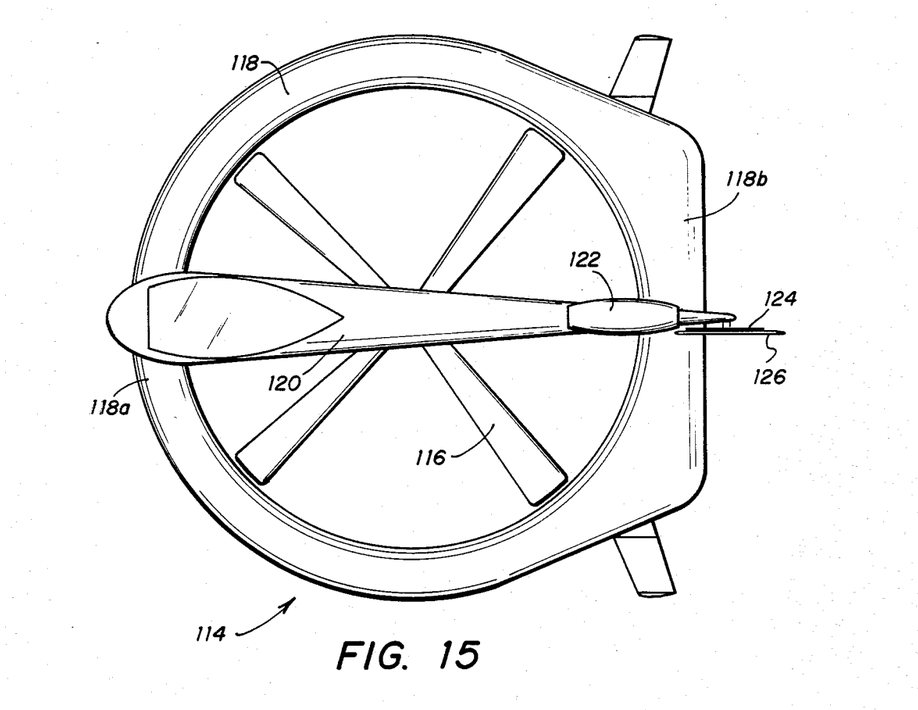
FIG. 15 is a plan view of the helicopter shown in FIG. 14.

In applications described above, the thrust ring of the present invention has been used in conjunction with a tail rotor of a helicopter. The thrust ring can also provide significant advantages when used in conjunction with the main rotor of a helicopter. Such an embodiment of an aircraft is illustrated in FIGS. 14 and 15. The aircraft 114 is fitted with a lower mounted main rotor 116. A thrust ring 118 is mounted low and outward from the main rotor 116. The aircraft 114 has a central fuselage 120 which encloses the passenger compartment and supports a power plant. Forward thrust and lift power are provided by a turbine engine 122. A counter-torque rotor 124 is mounted at the aft end of the aircraft and is provided with a thrust ring 126 similar to the tail rotor thrust rings described above. The aircraft is supported on the ground by landing gear 128 and 130.

The thrust ring 118 is configured to have an airfoil cross section 118a such as an NACA 23015 at the forward end of the aircraft and a similar but extended length airfoil 118b at the aft end of the aircraft. Note that the angle of attack of the airfoil section 118b is greater than the angle of attack of the airfoil section 118a. This difference in angle of attack can likewise be applied to the other embodiments of a thrust ring disclosed in this application.

As shown above in reference to FIG. 3 a rotor has a greater thrust efficiency when used in conjunction with a thrust ring. Thus, the use of the thrust ring 118 in conjunction with the main rotor 116 provides greater lift for a given amount of power input. Further the blades of rotor 116 can be designed to have a greater solidity ratio than that used in conventional main rotor blades. The greater solidity ratio enables the use of much shorter main rotor blades for given lifting power. It has been found to be advantageous to increase the solidity ratio of rotor blades used in conjunction with a thrust ring. The increased area of the blade tip increases the vortex generation which in turn increases the airflow through the ring. The aircraft also benefits from the further advantages of the thrust ring including reduced noise, less vibration and greater stability.

The countertorque rotor 124 and thrust ring 126 are similar to the structure described in reference to FIG. 3.

Figure 16:
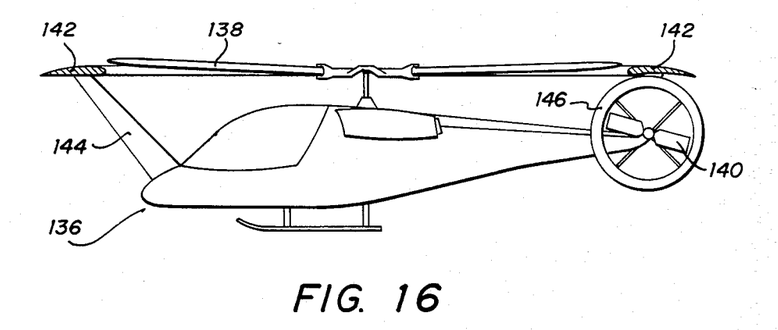
FIG. 16 is an elevation view of a conventional helicopter equipped with a thrust ring for the main rotor.

The thrust ring of the present invention can further be used with a conventional helicopter design as shown in FIG. 16. A helicopter 136 has a main rotor 138 and a tail rotor 140. A main rotor thrust ring 142 is supported at the forward end of the aircraft by a brace 144. At the aft end of the aircraft the main rotor thrust ring 142 is supported by a tail rotor thrust ring 146.

The leading edge section 142a of ring 142 has a lesser camber than the trailing section 142b. Also the chord length of section 142a is less than the chord length of section 142b.

The thrust rings 142 and 146 function in the same manner as that described in reference to the thrust rings in FIGS. 1 and 3 and provide the similar advantages including greater efficiency and lift, reduced noise, reduced vibration and greater stability. With the addition of the thrust ring 142 the diameter of the rotor 138 can be reduced to approximately 80% of the diameter of a rotor without a thrust ring.

As a general design example for the thrust ring of the present invention refer to now FIG. 3. It has been determined through design and experimentation that the optimum placement of the plane of the thrust ring is downstream from the plane of the rotor a distance equal to 0.05 of the radius of the rotor. The chord length of the thrust ring is preferably in the range of 0.2 to 0.25 of the radius of the rotor. The central opening of the thrust ring is slightly larger than the diameter of the rotor but there is no critical clearance between the rotor and the thrust ring. The cross section of the thrust ring is preferably an airflow shape such as a NACA 23015. However, other shapes such as a flat plate or circular cross section are also functional. Any cross sectional shape which operates to capture the vortex produced by the rotor serves to pump air and provide the numerous advantages of the present invention.

In summary the present invention comprises a helicopter rotor thrust ring which is in the shape of an annular airfoil having an interior opening slightly greater than the diameter of the helicopter rotor. The airfoil is supported in such a position that it is slightly downstream in the airflow from the rotor in such a position that the vortices produced by the rotor are captured by the airfoil on the downstream side. The captured votices function essentially as a pump to draw additional air through the center of the thrust ring thereby increasing the diameter of the wake produced by the rotor. The increased wake diameter and greater mass of airflow increase the efficiency of the rotor to increase thrust or offer equivalent thrust with less power. The thrust ring further offers a reduction in noise and vibration together with the physical guarding of the rotor to prevent harm to ground personnel and damage to the aircraft.

Although several embodiments of the invention have been illustrated in the accompanying drawings and described in the foregoing Detailed Description, it will be understood that the invention is not limited to the embodiments disclosed, but is capable of numerous rearrangements, modifications and substitutions without departing from the scope of the invention.

I claim:

1. Structure for enhancing the performance of a helicopter rotor, comprising:
   a thin substantially planar annular airfoil having a chord of up to 0.25 of the rotor radius and a thickness of about 15% of the airfoil chord and a central opening with a diameter slightly greater than the diameter of the rotor; and
   structure supporting said airfoil downstream from and coaxial with the rotor and in a plane essentially parallel to the plane of the rotor for capturing vortices produced in the wash of the rotor.

2. The structure recited in claim 1 wherein the cross section of said airfoil has a cambered configuration with the thickest section closest to the tip of the rotor.

3. The structure recited in claim 2 wherein the cross section at the leading section of said airfoil has a lesser camber then the cross section at the trailing section of said airfoil.

4. The structure recited in claim 1 wherein the leading section of said airfoil has a lesser chord length than the trailing section.

5. Structure for enhancing the performance of a helicopter rotor, comprising:
   a flat ring having an inner diameter slightly greater than the diameter of the rotor and having a chord of up to 25% of the rotor radius and a thickness of about 15% of said chord; and
   structure supporting said ring concentrically of said rotor in a plane parallel to the rotor for capturing vortices produced in the wash of the rotor.

6. Structure for enhancing the performance of a helicopter tail rotor, comprising:
   a thin substantially planar annular airfoil having a central opening approximately the diameter of the tail rotor; and
   structure supporting said airfoil such that said opening is downstream from and coaxial with the tail rotor and the plane of the airfoil is essentially parallel to the plane of the tail rotor.

7. The structure recited in claim 6 wherein the cross section of said airfoil has a cambered configuration.

8. The structure recited in claim 7 wherein the cross section of the leading section of said airfoil has a lesser camber than the cross section of the trailing section of airfoil.

9. The structure recited in claim 6 wherein the leading section of said airfoil has a lesser chord length than the trailing section.

10. Structure for enhancing the performance of a helicopter main rotor, comprising:
- a relatively thin annular airfoil having a central opening approximately the diameter of the main rotor and having a chord of up to 25% of the rotor radius and a thickness of about 15% of said chord; and
- structure supporting said airfoil such that said opening is coaxial with the main rotor and the plane of said airfoil is essentially parallel to and offset downstream from the plane of the main rotor.

11. The structure recited in claim 10 wherein the plane of said airfoil is offset downstream from the plane of said main rotor.

12. The structure recited in claim 10 wherein the cross section of said airfoil has a cambered configuration.

13. The structure recited in claim 11 wherein the cross section at the leading section of said airfoil has a lesser camber than the cross section of the trailing section of said airfoil.

14. The structure recited in claim 10 wherein the leading section of said airfoil has a lesser chord length than the trailing section.

15. A helicopter tail rotor structure comprising:
- a thin substantially planar airfoil having a circular opening approximately the diameter of the tail rotor, a semicircular leading edge and a truncated trailing edge; and
- structure supporting the airfoil such that the opening is downstream from and coaxial with the rotor and the plane of the airfoil is essentially parallel to the plane of the tail rotor.

16. The structure recited in claim 15 including means for canting the plane of said airfoil relative to the plane of said rotor.

17. The structure recited in claim 15 wherein the cross section of said airfoil has a cambered configuration.

18. The structure recited in claim 17 wherein the cross section of the leading section of said airfoil has a lesser camber than the cross section at the trailing section of said airfoil.

19. The structure recited in claim 15 wherein the leading section of said airfoil has a lesser chord length than the trailing section.

20. A helicopter tail rotor structure comprising:
- a thin annular airfoil having a central opening with a diameter slightly greater than the diameter of the rotor;
- a horizontal stabilizer joined to said annular airfoil; and
- structure supporting said airfoil and said stabilizer such that said opening is downstream from and coaxial with the rotor and the plane of the airfoil is essentially parallel to the plane of the rotor for capturing rotor vortices in the region on the downstream side of said airfoil.

21. The structure recited in claim 20 wherein the cross section of said airfoil has a cambered configuration.

22. The structure recited in claim 21 wherein the cross section at the leading section of said airfoil has a lesser camber than the cross section at the trailing section of said airfoil.

23. The structure recited in claim 20 wherein the leading section of said airfoil has a lesser chord length than the trailing section.

24. Structure for enhancing the performance of a helicopter trail rotor which is supported by a tail boom, comprising:
- a thin substantially planar airfoil having circular opening with a diameter slightly greater than the diameter of the tail rotor;
- a plurality of arms extending from the trail boom for supporting said airfoil such that said opening is downstream from and coaxial with said trail rotor and the plane of said airfoil is essentially parallel to the plane of said tail rotor; and
- means mounted to the trail boom and connected to at least one of said arms for changing the orientation of the plane of said airfoil relative to the plane of said tail rotor.

25. The structure recited in claim 24 wherein said airfoil is an essentially planar structure comprising a leading annular airfoil integral with a trailing vertical fin for providing transverse stabilization.

26. The structure recited in claim 24 wherein said arms are connected to said airfoil by pivot means to permit the plane of said airfoil to be changed in orientation relative to the plane of said tail rotor.

27. The structure recited in claim 24 wherein said arms include a fixed front arm and two vertically stacked and movable rear arms each of said arms connected to said airfoil by pivot means.

28. Structure recited in claim 24 wherein said means for changing comprises first and second actuators mounted to said tail boom, each actuator connected through linkage to an arm that is connected by a pivot means to said airfoil, said arms connected to said airfoil at vertically offset points.

29. A method for enhancing the performance of a helicopter rotor comprising the steps of:
- directing the airflow from the rotor through a circular opening in a thin substantially planar annular airfoil positioned downstream of the rotor and having a chord of up to 25% of the rotor radius and a thickness of about 15% of said chord; and
- capturing vortices produced at the tips of the rotors to produce a circulating airflow in the region adjacent the downstream surface of said airfoil to educt air from the region adjacent the upstream side of said airfoil through said opening.

30. The method recited in claim 29 including the step of blowing air from within said airfoil into said airflow in the region adjacent the downstream surface of said airfoil to increase the airflow through said opening.

31. The method recited in claim 29 including the step of drawing air into said airflow from the region adjacent the downstream surface of said airfoil to reduce boundary layer buildup.

32. A method of enhancing the performance of a helicopter tail rotor, comprising the steps of:
- directing the airflow produced by the tail rotor through a circular opening in a relatively thin airfoil positioned essentially parallel to and offset downstream from the plane of the tail rotor and having a chord of up to 25% of the rotor radius and a thickness of about 15% of said chord; and
- capturing vortices produced at the tips of the tail rotor to produce a circulating airflow in the region adjacent the downstream surface of said airfoil to educt air from the region adjacent the upstream surface of said airfoil through said opening.

33. A method for enhancing the performance of a helicopter main rotor, comprising the steps of:
- directing the downwash produced by the main rotor through a circular opening in a relatively thin airfoil positioned essentially parallel to and offset downstream from the plane of the main rotor and having a chord of up to 25% of the rotor radius and a thickness of about 15% of said chord; and
- capturing vortices produced at the tips of the main rotor to produce a circulating airflow in the region adjacent the downstream surface of said airfoil to educt air from the region adjacent the upstream surface of said airfoil through said opening into said downwash.

34. Structure for enhancing the performance of a helicopter main rotor and tail rotor, comprising:
- an annular airfoil having a central opening approximately the diameter of the main rotor;
- structure supporting said airfoil such that said opening is coaxial with the main rotor and the plane of the airfoil is essentially parallel to the plane of the main rotor and having a chord of up to 25% of the rotor radius and a thickness of about 15% of said chord for capturing vortices produced in the wash of the rotor;
- an annular airfoil having a central opening approximately the diameter of the trail rotor;
- structure supporting said airfoil such that said opening is coaxial with the tail rotor and having a chord of up to 25% of the rotor radius and a thickness of about 15% of said chord for capturing vortices produced in the wash of the tail rotor; and
- means for canting the plane of said tail rotor airfoil relative to the plane of said tail rotor.

* * * * *